Dec. 11, 1962  H. G. PRESTON  3,067,940
METHOD OF AND APPARATUS FOR TAKING ROOTS
Filed Aug. 11, 1958
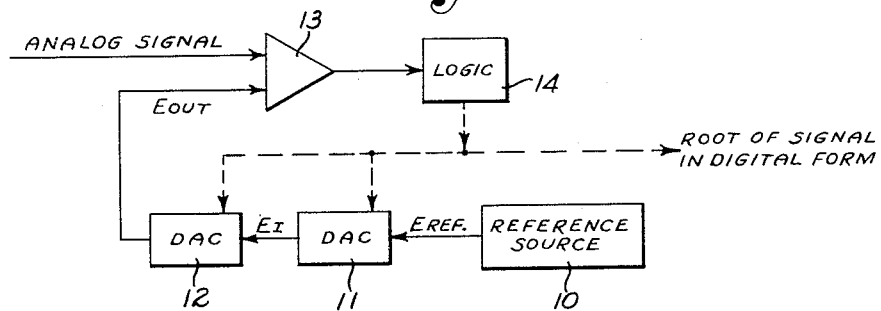
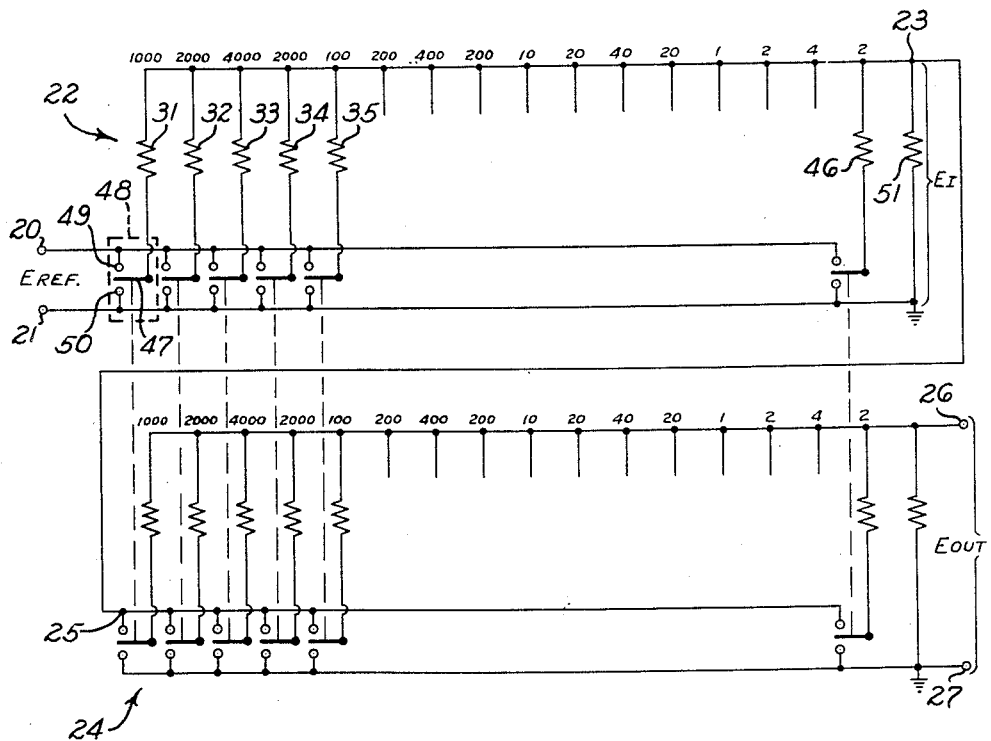
INVENTOR.
HOWARD G. PRESTON
BY HIS ATTORNEYS.
HARRIS, KIECH, FOSTER & HARRIS

United States Patent Office 3,067,940
Patented Dec. 11, 1962

3,067,940
METHOD OF AND APPARATUS FOR TAKING ROOTS
Howard G. Preston, Whittier, Calif., assignor to Beckman Instruments, Inc., a corporation of California
Filed Aug. 11, 1958, Ser. No. 754,380
6 Claims. (Cl. 235—193)

This invention relates to a method of and apparatus for generating a digital signal in response to an analog signal such that the digital signal is proportional to a root of the analog signal.

In measuring systems it is often required to obtain a digital record or reading related to a physical variable by measuring a voltage or current generated in response to said variable. Usually, the electrical voltage is directly related to the physical variable. However, sometimes the relationship is more complex. For example, it is often required to obtain a measure of fluid flow. Flow cannot easily be measured directly but differential pressure between two points along the flow path can. Then a measure of flow is obtained by taking the square root of the voltage signals generated by a differential pressure transducer coupled into the flow path. Accordingly, it is an object of the invention to provide a method of an apparatus for producing an output in digital form in response to an analog input such that the output is a root of the input.

It is an object of the invention to provide a method of and apparatus for extracting roots in digital form of an analog signal in which the operation is independent of mechanical inertia and can be carried out at high speeds which will not slow down or require changes in the timing cycle of associated equipment. A further object of the invention is to provide such a method and apparatus in which the accuracy is independent of moving components subject to wear and in which the significant elements can be inherently stable components which do not require calibration and adjustment.

It is an object of the invention to provide a method of and apparatus for extracting roots of an analog signal in which a plurality of digitally controlled voltage dividers or digital-to-analog converters are operated in cascade with the digital input to each of the converters being the same and equal to the desired root when the output of the last converter is equal to the analog input signal. A further object is to provide such an apparatus wherein the digital switching of the converters is controlled by the output of a comparator to change the digital input until the comparator output in zero.

It is an object of the invention to provide a method of and apparatus for extracting roots which may be used for square, cubic and higher order roots and which may be used with various digital codes, such as binary, decimal, and the like, and with various weighted codes.

It is an object of the invention to provide an apparatus for extracting roots comprising a plurality of cascaded conductance adders that are digitally operated simultaneously by switching devices connected in parallel relationship with the output of the cascade being varied to match the analog input signal and with deviation from such match being used to drive the digitally operated switching devices for varying the cascade output.

The invention also comprises novel details of construction and novel combinations and arrangements of parts together with other objects, advantages, features and results, which will more fully appear in the course of the following description. The drawing merely shows and the description merely describes preferred embodiments of the present invention which are given by way of illustration or example.

In the drawing:
FIG. 1 is a block diagram of a preferred embodiment of the invention; and
FIG. 2 is a schematic diagram of a pair of conductance adders connected for extracting square roots.

The circuit of FIG. 1 shows an apparatus for carrying out the method of the invention and providing a square root in digital form of an analog signal from a transducer or other source. A reference voltage, $E_{ref.}$, of a known and fixed magnitude is generated by a reference source 10. This reference voltage is connected as the input to a first digital-to-analog converter 11. This converter produces an output voltage referred to as the intermediate voltage, $E_1$, which is connected as the input to a second digital-to-analog converter 12. The output voltage of the second converter, $E_{out}$, is connected as one input to a comparator amplifier 13 with the incoming analog signal connected as another input to the comparator 13. The output voltage of the comparator is connected as the input to a logic unit 14 which in turn generates an output in digital form which is connected to each of the converters 11, 12, in parallel, serving as the digital input thereto.

Each of the digital to analog converters 11, 12, may be conventional in design, each generating an output voltage which is a function of an input voltage and an input digital number. The ratio of the output voltage to the input voltage is proportional to the digital number input.

The comparator amplifier 13 may be conventional in nature and provides an output which is a function of the difference between the two inputs thereto, with the output being zero when the inputs are equal. The logic unit 14 operates in the same manner as the logic unit of a conventional analog-to-digital converter providing an output in digital form for actuating the digital-to-analog converters 11, 12 to vary the magnitude of the voltage $E_{out}$ to make it equal to the analog input signal. The output of the logic unit serves to drive both of the digital-to-analog converters in parallel and simultaneously, with the digital output of the logic unit when the inputs to the comparator are equal being the square root of the input signal. When the inputs to the comparator are equal, the analog input signal will be equal to $r^2 x E_{ref.}$ where $r$ is the output-to-input ratio of each of the digital-to-analog converters. Then $r$, expressed in digital form as the output of the logic unit, is equivalent to the desired root. Higher order roots may be similarly extracted by using additional digital-to-analog converters in cascade, with a circuit for extracting an $n$th order root requiring $n$ converters.

It should be noted that the equipment of FIG. 1 requires no more time for operation than a conventional analog-to-digital converter and, hence, can be used in a data handling system or the like without requiring any changes or increases in the timing cycle.

FIG. 2 shows a preferred circuit for the digital-to-analog converters comprising two conductance adders using a 1-2-4-2 decimal code for providing the desired root in decimal form. The voltage, $E_{ref.}$, from the reference source 10 is connected across terminals 20, 21 of a first conductance adder 22, with the terminal 21 being connected to a common circuit ground. The output of the first adder, $E_1$, appears at terminal 23 and is connected as an input to a second conductance adder 24 at a terminal 25. The output of the second adder, $E_{out}$, is developed at terminals 26, 27 for connection as an input to the comparator amplifier 13.

The conductance adders 22 and 24 are identical and 22 will be described in detail herein. The adder includes sixteen resistors 31–46, the conductances of which have a particular relation to each other (all of the resistors are not shown in the drawing for purposes of clarity). Each resistor is connected between the terminal 23 and moving contact 47 of a corresponding switch 48, there being a separate switch for each resistor. One fixed contact 49 of each switch is connected to the input terminal 20 and the other fixed contact 50 is connected to the input terminal 21 and common circuit ground. A resistor 51 is connected between the terminal 23 and circuit ground.

The ratio of the conductances of the resistors 31–46 is indicated by the numbers appearing above each of the resistors in FIG. 2. This may be accomplished by giving the resistors 31, 32, 33, 34, 35, etc., the resistances of 10,000 ohms, 5,000 ohms, 2,500 ohms, 5,000 ohms, 100,000 ohms, etc., respectively, with the resistance of the resistor 51 equal to that of the resistor in the 1 line, namely 10 megohms. The ratio of output voltage to input voltage for the adder is equal to the sum of the conductances of the resistors which are connected to the input terminal divided by the sum of the conductances of all seventeen resistors. Corresponding switches in both of the adders are interconnected so as to be actuated simultaneously by the logic unit. The switches may be conventional relays, or electronic switches, or the like.

The conductance adder 22, having four groups of four resistors each, with the conductances of the resistors in each group having the ratio 1–2–4–2, permits generation of an output to input ratio of any integer multiple of .0001 between .0000 and .9999. If an additional digit is desired in the ratio, an additional group of four resistors may be added and, conversely, if fewer digits are required, groups of resistors can be omitted.

In the operation of the circuit, after an analog input voltage has been coupled to the comparator 13, the logic unit 14 will sequentially actuate the switches 48 of both of the adders to sequentially generate voltages for comparison with the input signal. When the two inputs to the comparator are equal, or actually when the difference is less than one-half the smallest voltage change provided by the adders, the logic unit will stop switching and the digital number represented by the actuated switches will be the desired root.

Hence it is seen that any order root of an analog voltage may be taken using a plurality of conductance adders connected in cascade and actuated digitally in parallel, with the number of adders corresponding to the order of the root and with the desired root being provided in digital form.

The conductance adders may be constructed using fixed value resistors and do not require subsequent adjustment or calibration. Furthermore, there are no moving parts in which wear will affect the accuracy of the system, the switches 48 being merely off-on devices. A further advantage achieved by the method and apparatus of the invention lies in the fact that it is not necessary to convert the incoming analog signal to digital form before extracting the desired root.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In an apparatus for extracting roots of an analog input signal, the combination of: a reference voltage source; a plurality of digital-to-analog converters, each having an analog voltage input, an analog voltage output, and a digital input, with the relation of the output voltage to the input voltage a linear function of said digital input; means for connecting said converters in cascade with the voltage output of one connected as the voltage input of the next and with the reference voltage connected as the voltage input of the first converter; a comparator for providing an output which is a function of the difference between two inputs thereto; means for connecting the analog input signal and the output voltage of the last converter as inputs to said comparator; and means energized by the output of said comparator for generating a digital input for controlling said converters, with the digital input when the comparator output is zero being the desired root.

2. In an apparatus for extracting roots of an analog input signal, the combination of: a reference votage source; a first digital-to-analog converter for producing an analog output voltage as a function of an analog input voltage and a linear function of a digital input with said reference voltage connected as the input voltage thereto; a second digital-to-analog converter for producing an analog output voltage as a function of an analog input voltage and a linear function of a digital input, with the output voltage of said first converter connected to the second converter as the input voltage; a comparator having the analog input signal and the output voltage of said second converter as inputs and providing an output which is a function of the difference between said inputs; and a digital signal generator providing a digital input for energizing both of said converters as a function of the output of said comparator, with the digital input when said comparator output is zero being the desired root.

3. In an apparatus for extracting an $n$th order root of an analog input signal, the combination of: $n$ means for dividing an input analog voltage to produce an output analog voltage with the ratio of output to input being determined by and proportional to a digital number coupled to said dividing means; a reference voltage source; circuit means for connecting said reference voltage source to the first dividing means as the input voltage thereto and connecting the output voltage of each dividing means, except the $n$th, as the input voltage of the next dividing means; a comparator having the anolog input signal and the output voltage of the $n$th dividing means as inputs and producing an output which is a function of the difference between said inputs; a digital number generator coupled to each of said dividing means in controlling relationship for supplying the digital number thereto; and circuit means for connecting the output of said comparator to said generator for varying the number to bring said comparator output to zero, such number being the desired $n$th root.

4. In an apparatus for extracting roots of an input signal, the combination of: a plurality of conductance adders connected in cascade with the output analog voltage of each, except the last, connected as the input analog voltage of the next succeeding adder, each of said adders having a plurality of switches which are actuated to provide a particular ratio between the output and input voltages thereof, said output voltages being proportional to the switches actuated; means for interconnecting corresponding switches in each of said adders for simultaneous actuation; a reference voltage connected as the input voltage to the first adder of the cascade; means for comparing the input signal with the output voltage of the last adder of the cascade; and means for actuating the corresponding switches of each of said adders simultaneously to vary said ratio and make the input signal equal to the output voltage of said last adder, with the ratio which produces said equality being the equivalent of the desired root.

5. In an apparatus for taking square roots, the combination of: a comparator for determining the difference between two input voltages and producing an output voltage which is a function of such difference; first and second conductance adders having a plurality of switches and providing analog outputs which are a function of the analog input thereto and a linear function of the setting of said plurality of switches; a reference voltage source; means for connecting said reference voltage as the input to said first adder, and the output of said first adder as the input of said second adder, and the output of said second adder as one of said two input voltages to said comparator; means applying the second of said two input voltages to said comparator; and an adder switch control circuit energized by the output voltage of said comparator for changing the setting of corresponding switches in each of said adders simultaneously to vary the output thereof and make said comparator inputs equal.

6. In an apparatus for extracting roots of an input signal, the combination of: a plurality of conductance adders connected in cascade with the analog output voltage of each, except the last, connected as the input analog voltage of the next succeeding adder, each of said adders having a plurality of switches which are actuated to provide a particular ratio between the output and input voltages thereof, with each switch operable for connecting a resistor either in series between the input and output or in parallel with the output, with the conductance of said resistors having the ratio to each other of $.1 \times 10^n$, $.2 \times 10^n$, $.4 \times 10^n$, $.2 \times 10^n$, with $n$ equal to 1, 2, 3 . . . , and with a resistor of a conductance equal to one of said resistors which has a ratio of $.1 \times 10^n$ connected in parallel with the output; means for interconnecting corresponding switches in each of said adders for simultaneous actuation; a reference voltage connected as the input voltage to the first adder of the cascade; means for comparing the input signal with the output voltage of the last adder of the cascade; and means for actuating corresponding switches of each of said adders simultaneously to vary said ratio and make the input signal equal to the output voltage of said last adder, with the ratio which produces said equality being the equivalent of the desired root.

References Cited in the file of this patent

UNITED STATES PATENTS

| | | |
|---|---|---|
| 1,515,995 | Bryce | Nov. 18, 1924 |
| 2,839,744 | Slocomb | June 17, 1958 |

OTHER REFERENCES

Step Multiplier in Guided Missile Computer (Goldberg), Electronics, vol. 24, No. 9, August 1951, pages 120–124.

Product Engineering (Wall), September 1953, pages 134–140.

Electronic Analog Computers (Korn and Korn), 1952, pages 226–228.

ISA Journal (Fletcher et al.), September 1955, pages 341–345.

The Multiverter (An Engineering Bulletin of the Packard-Bell Computer Corp.), received in Div. 23 Nov. 20, 1957; 10 pages.

UNITED STATES PATENT OFFICE
CERTIFICATE OF CORRECTION

Patent No. 3,067,940                              December 11, 1962

Howard G. Preston

It is hereby certified that error appears in the above numbered patent requiring correction and that the said Letters Patent should read as corrected below.

Column 1, line 50, for "in" read -- is --; line 57, for "comprosing" read -- comprising --; column 4, line 7, for "votage" read -- voltage --; column 5, line 8, for "analog output" read -- output analog --.

Signed and sealed this 16th day of July 1963.

(SEAL)
Attest:

ERNEST W. SWIDER                              DAVID L. LADD
Attesting Officer                                 Commissioner of Patents